United States Patent

Hock et al.

[11] Patent Number: 5,551,343
[45] Date of Patent: Sep. 3, 1996

[54] SPECIAL GEOMETRY GENERANT BODIES FOR AUTOMOTIVE GAS BAG INFLATOR

[75] Inventors: Christopher Hock, Uintah; Brian T. Snyder, Hooper; Linda M. Rink, Liberty; Guy R. Letendre, Ogden, all of Utah

[73] Assignee: Morton International, Inc., Chicago, Ill.

[21] Appl. No.: 185,535

[22] Filed: Jan. 21, 1994

[51] Int. Cl.⁶ ................................ C06B 45/00
[52] U.S. Cl. ................ 102/288; 102/289; 102/292
[58] Field of Search .................. 102/288, 289, 102/292

[56] References Cited

U.S. PATENT DOCUMENTS

| | | | |
|---|---|---|---|
| 3,256,819 | 6/1966 | Leeper | 102/288 |
| 4,408,534 | 10/1983 | Araki et al. | 102/288 |
| 4,817,828 | 4/1989 | Goetz | 102/288 |
| 4,840,025 | 6/1989 | Coffinberry | 102/289 X |
| 4,919,897 | 4/1990 | Bender et al. | 102/530 |
| 5,101,730 | 4/1992 | Bender et al. | 102/288 |
| 5,367,872 | 11/1994 | Lund et al. | 102/288 |
| 5,368,329 | 11/1994 | Hock | 102/288 X |
| 5,385,099 | 1/1995 | Chase | 102/289 |

*Primary Examiner*—Peter Nelson
*Attorney, Agent, or Firm*—L. Dewayne Rutledge; Charles N. Lovell; Gerald K. White

[57] ABSTRACT

A gas generant body having a plurality of alike, flat-surfaced projections equally spaced and radially equidistant about the periphery of one or both sides of the body. The spaced projections are defined by curved or arcuate walls emanating from the center of the generant body which flare outwardly to the body's perimeter, each having an angular arc length greater than the space therebetween. The outer edge of each projection is preferably contiguous with the perimeter of the body. When the projections are on both sides, as is preferred, the projections on one side are preferably in a staggered or offset relationship to those on the other side. A washer-shaped wafer disc is the most preferred overall generant body form. A stack or assembly of the multiprojection generant wafers may be formed into an array for use in a gas generator for an automobile gas bag inflator. Each generant wafer acts as its own spacer, can be assembled independent of orientation, will not mesh or interlock with adjacent wafers and does not need extra inflator hardware.

16 Claims, 3 Drawing Sheets

SPECIAL GEOMETRY GENERANT BODIES FOR AUTOMOTIVE GAS BAG INFLATOR

CROSS REFERENCE TO RELATED COPENDING APPLICATIONS

This application is related to commonly assigned application Ser. No. 07/848,903 filed Mar. 10, 1992.

BACKGROUND OF THE INVENTION

1. Field of the Invention

The present invention pertains to pyrotechnic bodies, preferably circular wafers and most preferably washer-shaped discs, made of conventional propellant or gas generant compositions which are fabricated to have a special or unique geometry, especially when stacked or arranged in side by side array in the combustion chamber of a gas generator or inflator. The inflator produces a gas which, after filtering out condensed phase products, is preferably used to inflate a gas bag which serves as a vehicle occupant cushion during a collision. More particularly this invention relates to a novel geometry for the generant body wherein a plurality of equally spaced projections which have special size, shape and location are integrally formed (molded) into one or both sides or faces of the body, preferably both, thereby facilitating spacing of plural bodies when stacked or assembled, for example, as an array and preferably side by side in abutting relationship in an inflator thereby enhancing combustion and gas flow during use.

Even though the generant bodies of this invention are especially designed and suited for creating gas for inflating passive restraint vehicle crash bags, it is to be understood that they would function well in other less severe inflation applications, such as aircraft slides, inflatable boats and inflatable lifesaving buoy devices; would more generally find utility any place a low temperature, non-toxic gas is needed, such as for a variety of pressurization and purging applications as, for example, in fuel and oxidizer tanks in rocket motors; and would be useful as a propellant for recoilless rifles and missile systems, particularly in in-tube rocket motors of the short-burning, high-mass type as disclosed in U.S. Pat. No. 3,886,006.

2. Description of the Prior Art

Automobile gas bag systems have been developed to protect the occupant of a vehicle, in the event of a collision, by rapidly inflating a cushion or bag between the vehicle occupant and the interior of the vehicle. The inflated gas bag absorbs the occupant's energy to provide a gradual, controlled deceleration, and provides a cushion to distribute body loads and keep the occupant from impacting the hard surfaces of the vehicle interior.

The use of such protective gas-inflated bags to cushion vehicle occupants in crash situations is now widely known and well documented.

The requirements of a gas generant suitable for use in an automobile gas bag device are very demanding. The gas generant must have a burning rate such that the gas bag is inflated rapidly (within approximately 150 milliseconds). The burning rate must not vary with long term storage (aging) or as a result of shock and vibration during normal deployment. The burning rate must also be relatively insensitive to changes in humidity and temperature. When pressed into wafers, cylinders, discs or whatever shape, the hardness and mechanical strength of the bodies must be adequate to withstand the mechanical environment to which they may be exposed over the expected inflator system lifetime of at least ten years without any fragmentation or change of surface area. Excessive breakage of the bodies could potentially lead to system failure where, for example, an undesirable high pressure condition might be created within the gas generator device, possibly resulting in rupture of the pressure housing.

The gas generant must efficiently produce cool, non-toxic, non-corrosive gas which is easily filtered to remove solid and liquid combustion by-products, and thus preclude damage to the inflatable bag or to the occupant of the automobile.

The requirements as discussed in the preceding paragraphs limit the applicability of many otherwise suitable compositions and shapes thereof from being used in automotive air bag gas generators.

Inflators such as shown in commonly assigned U.S. Pat. Nos. 4,005,876; 4,296,084 and 4,547,342 contain gas generant in the form of pressed pellets or tablets (similar in shape to ALKA-SELTZER® buffered aspirin) which are randomly packed into the inflator combustion chamber. While such an arrangement may be satisfactory for some purposes, the tablets present a high initial surface area for burning and thus do not provide as soft of an inflation onset as may be desired and achieve low volumetric loading fraction due to the volume lost in the interstitial spaces between tablets.

To achieve slower inflation onset and increase volumetric loading fraction, it has been proposed in U.S. Pat. Nos. 3,901,530 and 4,131,300 to form the pyrotechnic combustible material for inflators in the form of separate discs arranged side by side with separator means disposed between adjacent discs to facilitate quick and uniform combustion of the material.

It has been proposed in U.S. Pat. No. 4,200,615 to fabricate a propellant grain from a plurality of washer-shaped discs 26 arrayed side by side on a linear igniter 8 in an inflator combustion chamber.

It has also been proposed in U.S. Pat. No. 4,158,696 to press the propellant into wafers and to configure each wafer in a manner to allow space for a propellant powder to be uniformly placed between the wafers to cushion each wafer from shock and vibration and to insure near instantaneous ignition of all wafers. The disposition of propellant powder between the wafers, however, may undesirably result in a fast onset of burning thus producing too high of an initial pressure peak as well as a decreased burn surface neutrality.

More recently it has been proposed in commonly assigned U.S. Pat. Nos. 4,890,860 and 4,998,751 to fabricate an inflator grain by assembling a plurality of washer-shaped propellant wafers or discs in alternating relationship with a plurality of similarly shaped meshed cushion members which are held in compression in the inflator combustion chamber to achieve improved performance.

It is also known from U.S. Pat. No. 4,817,828 that an inflator grain or material 60 may be formed by assembling a plurality of cylindrically shaped grains 64 and 66 (FIG. 5), each having an array of axially alignable central and outer peripheral gas passages. The end surfaces of the grains are provided with peripherally located projections 158 and 160, and 164 and 166 (FIGS. 5 and 8) which abut each other thereby acting as standoffs or spacers thus allowing radial gas flow between grains. The plurality of grains require a rather precise and complex assembling operation involving additional features and components to insure proper alignment of the standoff pads and gas passages. This alignment is achieved by placement of a multi-arm retainer device (FIG. 9) about the overall grain 60 which engages V-shaped notches 178 (FIG. 6) and 180 (FIG. 7) in the outer sides of each grain. The retainer becomes a permanent part of the inflator.

It is also known from U.S. Pat. Nos. 4,191,897 and 5,101,730 to provide washer-shaped gas generant discs or moldings with projecting knubs or islands on each side whereby a spacer zone would be created between stacked disc-shaped moldings thereby attaining improved combustion of the discs.

OBJECTS AND SUMMARY OF THE INVENTION

It is therefore an object of the present invention to provide a gas generant body in a configuration that will have superior strength, act as its own spacer and have excellent combustion and gas flow characteristics when stacked or assembled with other similar bodies into an inflator by virtue of its shape.

Another object of the present invention is to provide a gas generant body which will minimize high bending stresses and consequent cracking and ignitor shattering effects experienced in similar wafers provided with projections or knubs so configured as to predictably and undesirably allow propagation of cracks along straight lines.

Another object of the present invention is to provide a gas generant body so configured that it can be easily assembled with like bodies into an inflator independent of orientation and which is further incapable of meshing or interlocking with adjoining similar bodies when so assembled.

Yet another object of the present invention is to provide a gas generant body for an inflator grain assembly which will eliminate any need for additional features, especially spacers or extra parts in order to assemble or align similar bodies or to maintain a path of radial gas flow when used.

As set forth in greater detail below, the above objectives of the present invention have been achieved in a gas generant body by providing the body with a plurality of relatively flat projections or islands equally spaced and radially equidistant about the periphery of at least one side or face of the body.

Characteristic of the wafer embodiments shown in the Figures is that each equally spaced, alike projection have inside connecting walls which curve and flare outwardly from the wafer center to its perimeter. The curved walls outline raised areas (or sections) and lowered areas (or spaces therebetween). When an arc is drawn on the wafer from at least one distance from the center of the wafer, the angular arc length of each raised section is significantly greater than the angular arc length of each space therebetween. The dimensions of these arc lengths is the principal feature which permits these wafers, when stacked, to resist meshing or interlocking.

A preferred characteristic of the embodiments shown is that the outer edge of each projection be contiguous with the wafer perimeter.

The number of projections or islands on each body face can vary upwards from a minimum of two, preferably at least three, to ten or more. Having such projections on both sides of the body is preferred. When on both sides of the body, the projections may be either radially offset or aligned from face to face, preferably in offset relationship. The projections may as shown in the Figures preferably extend substantially from the inside edge to the outside edge of the body which projections are radially defined by non-intersecting curved lines. The preferred gas generant body shape is cylindrical, the most preferred a being washer-shaped disc.

Another important feature relates to a random assembly or stack of similar generant bodies according to the present invention, preferably made of an azide based composition.

Still another important feature pertains to a conventional gas generator for an automobile gas bag inflator including a random stack or assembly of similar generant bodies according to the present invention.

The above and other objectives, advantages and features of this invention will be apparent in the following detailed description of the preferred embodiments thereof which is to be read in connection with the accompanying drawings.

DETAILED DESCRIPTION OF THE INVENTION

Figure 1:
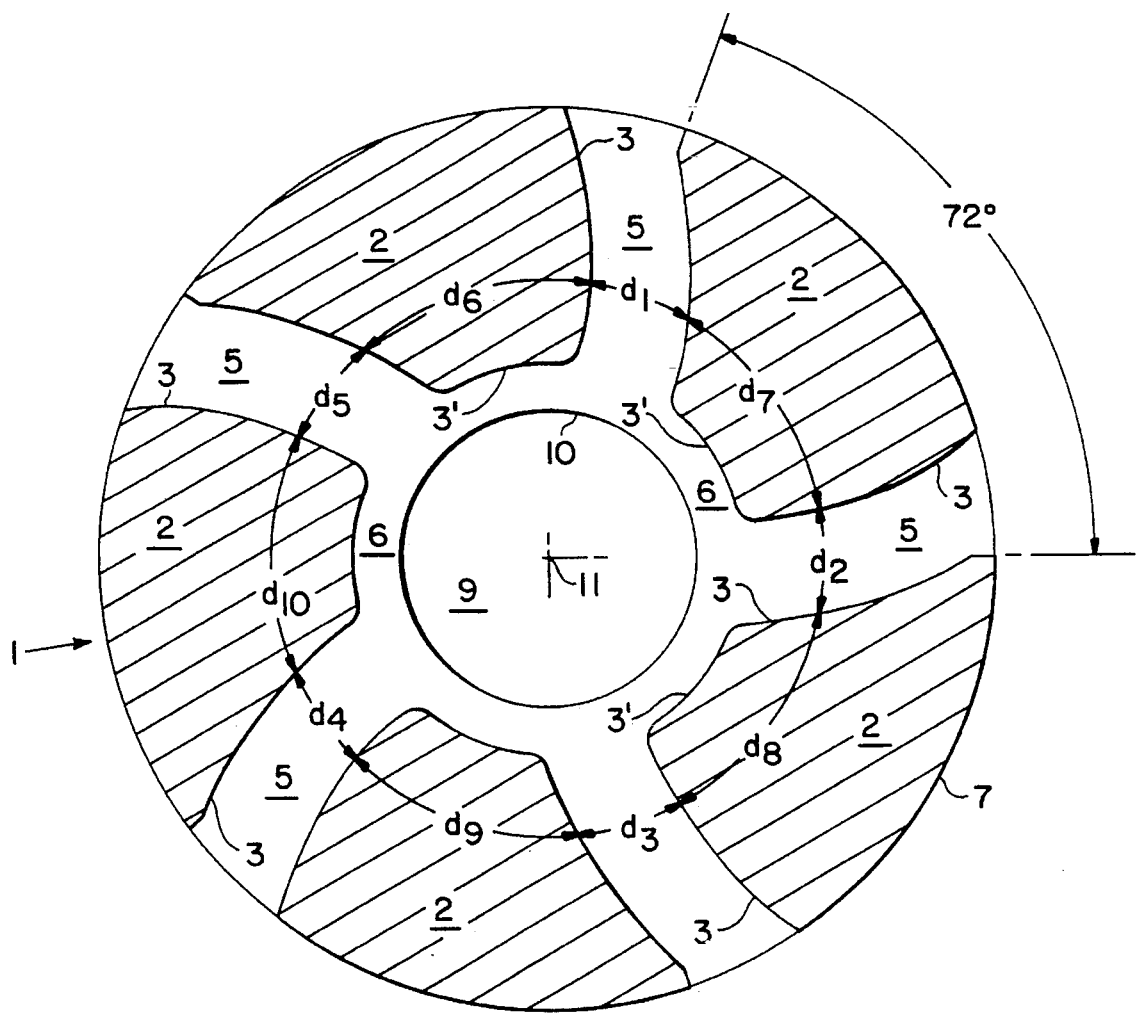
FIG. 1 is a top view of a washer-shaped generant disc having curved projections of one configuration substantially spanning the annular face of the disc.
Figure 2:
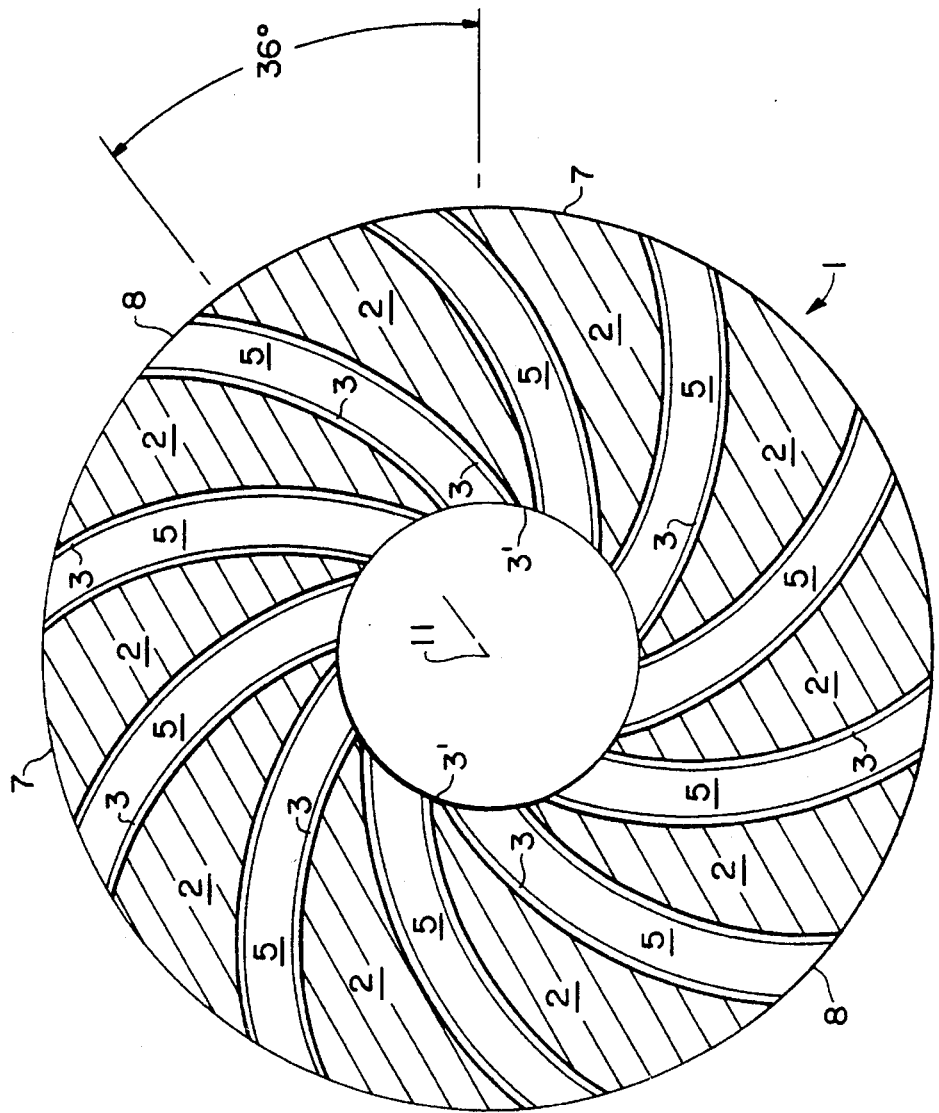
FIG. 2 is a top view of a washer-shaped generant disc having curved projections of another configuration completely spanning the annular face of the disc.
Figure 5:
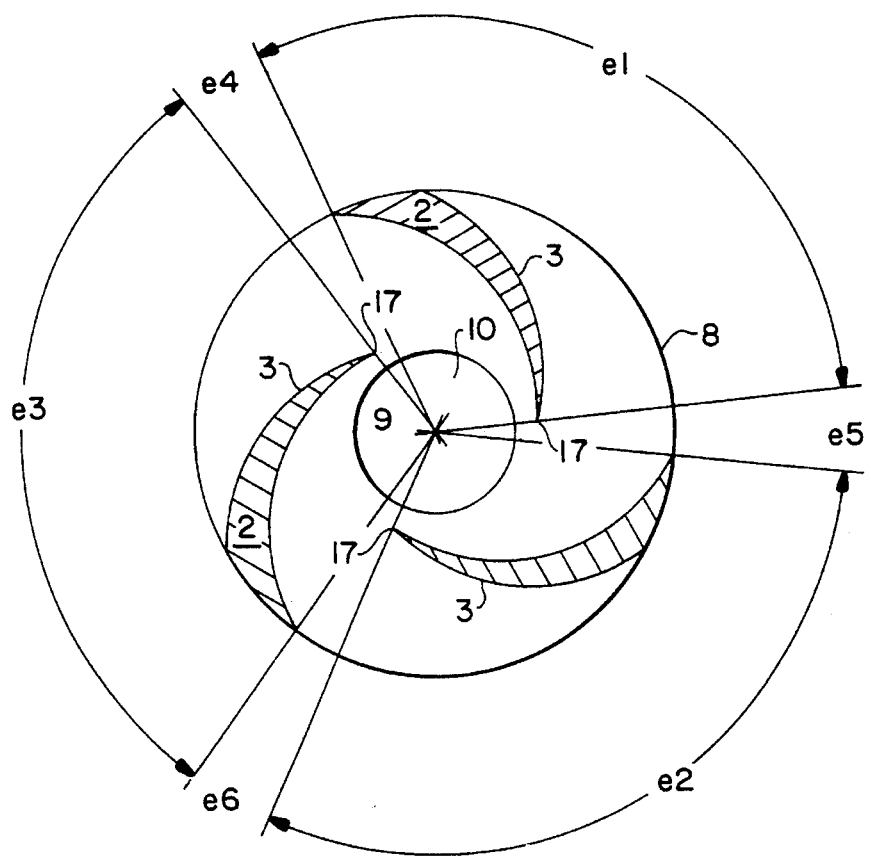
FIG. 5 is a top view of a washer-shaped generant disc having curved projections of another configuration on its face.

According to the invention and referring to the drawings in general, FIGS. 1, 2 and 5 show several exemplary embodiments of individual generant bodies or wafers 1 having differently shaped or configured projections 2 on one or both faces or sides.

Figure 4:
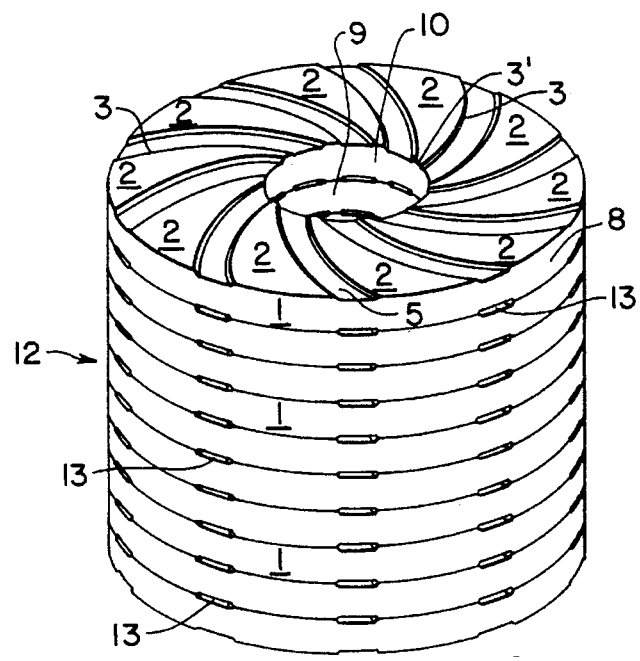
FIG. 4 is a space view of a stacked array of discs as shown in FIG. 2.

Although, as indicated above, the potential usefulness of such wafers may be quite varied, a preferred application according to the invention is a random stack or train of the wafers 1 abutting one another, for example, in array 12 as depicted in FIG. 4. And forming the overall grain or combustion array in the combustion chamber of a conventional inflator or gas generator is a preferred application of such an array of wafers 12 which is especially useful for such purposes as rapidly inflating vehicle passive restraint crash protection gas bags, as typically illustrated in aforementioned U.S. Pat. Nos. 4,200,615; 4,890,860 and 4,998,751. These documents illustrate the well known basic component parts of such exemplary inflators; namely, a combustion chamber with a gas outlet, a gas generating or propellant grain disposed within the combustion chamber, an igniter for the grain in close proximity and gas passage means for routing gas generated to the gas outlet from the chamber.

FIG. 1 shows five projections or raised islands 2 on one side or face of a washer-shaped wafer having a circular opening 9. The projections 2 are alike (i.e. have the same cross section) or identical, equally spaced circumferentially about the wafer face, and radially equidistant from the wafer center 11. Each projection 2 has the general shape of a curved-wall, irregular polygon (resembling a slice of pie). Connecting walls 3 and 3' of the projections are curved (arcuate). Each set of spaced, facing arcuate inside walls 3 are parallel and drop perpendicularly to the lower main wafer surfaces 5 and 6. Interior curved walls 3' of each projection drop perpendicularly to an annular shelf 6 about the wall 10 of opening 9. Outside walls 7 of each projection 2 merges and forms a contiguous wall with the wafer perimeter wall 8. Curved walls 3 of each projection emanate from the center 11 or opening 9 of the wafer and expand or curve counterclockwise to the outside edge or perimeter 8. As above indicated, the raised sections 2 are equally spaced; thus the elongated spaces 5 or angular arc lengths ($d_1$–$d_5$) are equal. If drawn from any common radius from the wafer center 11, the angular arc lengths ($d_6$–$d_{10}$) of each projection 2 are equal. As shown, each angular arc length of the spaces 5 is significantly less than each angular arc length of the projections 2. Conversely each angular arc length drawn of the raised sections significantly would exceed the angular arc length of each space 5 therebetween. This is always true in this embodiment because the angular arc length of wall 3' defining the shortest and most interior wall of each projection significantly exceeds the angular arc length of each space 5. Thus any total angular arc length ($d_1+d_2+d_3+d_4+d_5$) of the equal width spaces 5 would be significantly less than the total angular arc length ($d_6+d_7+d_8+d_9+d_{10}$) of the spacer pads or raised sections 2. Conversely any total angular arc length drawn of the spacer pads or raised sections 2 would significantly exceed the total angular arc length of the spaces 5. The dimensions of these arc lengths is the feature responsible for these wafers, when stacked in abutting relationship, to resist and prevent meshing or interlocking of adjacent wafers.

FIG. 2 illustrates another wafer configuration very similar to that of FIG. 1 in that each projection 2 has the general shape of a curved-wall, irregular polygon (resembling a slice of pie). However, the FIG. 2 design has ten projections or pads 2 (instead of five), the curved connecting walls 3 emanate from the interior edge or wall 10 of the circular opening 9 (instead of from an annulus or shelf), and connecting walls 3 slope to the main wafer surface 5 at a 45° angle (instead of a 90° angle). Similar to the merger between outside walls 7 and 8, the inside wall 3' of each projection forms a contiguous wall with wall 10 of opening 9. Thus, similar to FIG. 1, equally spaced walls 3 of each of the ten projections (which expand or curve counterclockwise to the outside edge or perimeter 8) define angular arc lengths which have the same dimensions whether viewing the spaces 5 or the projections 2. As can be seen, certain angular arc lengths drawn at or near interior most wall 3' of this embodiment's projections 2 would not be greater than the angular arc length of each space therebetween; however, as long as one or more of the angular arc lengths similarly drawn anywhere along the outwardly flaring expanse or segment of each projection is significantly greater than the angular arc length of the space 5, then a stack of similar wafers will not mesh or interlock.

Figure 3:
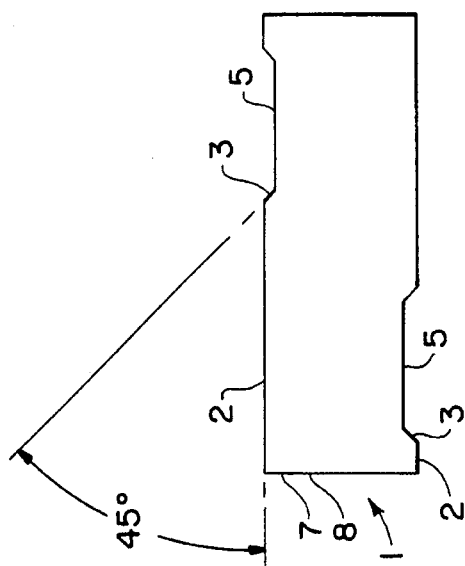
FIG. 3 is a cross-sectional view through plane AA of the disc shown in FIG. 2.

FIG. 3 is a cross sectional view through plane AA of generant disc or wafer 1 shown in FIG. 2 illustrating the projections 2 on both faces of the wafer, inside curved walls 3 of the projections sloping at 45° angles to the main wafer surfaces 5, and outside walls 7 merging and forming a contiguous wall or plane with the wafer perimeter 8.

FIG. 4 shows a stacked, randomly oriented array 16 of wafer discs as individually depicted in FIG. 2. The wafers forming the stack are randomly oriented because they have been assembled independently of any special orientation which is permitted by the special configuration of the projections on both sides of the wafers, and are incapable of meshing or interlocking. Standoff projections or pads 2 form radially random spaces or gaps 13 between and penetrating the interfaces of adjacent wafers 1, which spaces serve as gas flow passages facilitating combustion, especially in a gas generator.

FIG. 5 illustrates yet another wafer configuration similar to that of FIG. 1 in that each identical projection 2 has the general shape of a curved-wall, irregular polygon. However, FIG. 5 has only three projections or pads 2 (instead of five) and the curved connecting walls 3 emanate from an inner annulus at points 17 equally spaced from the interior edge or wall 10 of the circular opening 9. The outside walls 7 of each projection may, as shown, merge and form a contiguous wall with the wafer perimeter wall 8, though this is not required. Raised sections or pads 2 are equally spaced whereby the angular arc lengths ($e_4$–$e_6$) of the spaces therebetween are equal. The angular arc lengths ($e_1$–$e_3$) of the projections are also equal and exceed the angular arc length of the spaces. Similar to FIG. 1, any total angular arc length ($e_1+e_2+e_3$) of the projections is greater than the total angular arc length ($e_4+e_5+e_6$) of the spaces. And as in FIG. 2, as long as one or more of the angular arc lengths similarly drawn anywhere along each projection is significantly greater than the angular arc length of the spaces then no meshing or interlocking of similar wafers when stacked would occur.

The contiguous edge feature produces several advantages and enhanced properties with respect to the overall wafer design shown in FIGS. 1–5 not enjoyed by other similar wafer designs; for example, that shown in FIGS. 5 and 6 of aforementioned U.S. Pat. No. 4,919,897. These properties or advantages are inclusive of (1) increased strength, particularly along the individual wafer perimeters, and durability, (2) ease and simplicity of manufacture, i.e. both from a mold fabrication standpoint as well as molding of the wafers (powder compacts) and (3) increased potential for increasing the individual and total surface area of the projections since access to a larger percentage of the wafer face exists, and (4) less dependency upon the confinement of the wafers on the outside for combustion. Burning of the pyrotechnic typically progresses from the inside diameter, where the ignition train is located, to the outside diameters of the wafers. Whereas in the configuration taught by U.S. Pat. No. 4,919,897, the path of flow for hot ignition gases would be obstructed by the raised sections 8, and the area located just outside of the raised sections would not be exposed to the ignition sources until confinement of the gases forces the flow to "turn the corners" (so to speak) and impinge upon these sections. This "turning of the corners" would be dependent upon how much confinement the wafers have on the outside diameter (O.D.). If the O.D. were fully confined, the gases would "turn the corners" fairly easily; whereas if the O.D. were free (unconfined) ignition of each wafer face in the area would lag by the amount of time it would take for the flame front of the burning generant to progress to these areas. However, as shown in the wafer embodiments of FIGS. 1–5, especially FIGS. 1 and 2, the surface area exposed to the ignition source is maximized, resulting in a more repeatable burning of the generant wafer.

As previously indicated this contiguous edge feature is only preferred in the embodiments shown, especially for the reasons given in (2) above. Thus it is within the purview of the invention to recess or taper the outer edges of the projections inwardly from the wafer perimeter.

Each of the projections or pads 2 are integrally formed into a one piece generant body 1, e.g. by hydraulically or mechanically consolidating or pressing a requisite amount of powdered gas generant composition in a suitably designed die (e.g. steel), as is conventional in the art as disclosed in commonly assigned U.S. Pat. No. 5,019,220 and the art cited therein. The gas generant material may be any known propellant material, for example, any azide or non-azide based composition for automobile gas bag inflators meeting such well known requirements as burning rate, non-toxicity and flame temperature. The generant is preferably an azide based composition. Exemplary azide-based compositions are disclosed in U.S. Pat. Nos. 3,895,098; 4,203,787; 4,376,002; 4,547,235 and 5,019,220 and in commonly assigned copending application Ser. Nos. 07/749,032, filed Aug. 23, 1991, and 07/787,500, filed Nov. 4, 1991, and additional art cited therein. Exemplary non-azide based formulations are disclosed in U.S. Pat. Nos. 3,897,285; 3,901,530; 3,901,747 and 4,369,079 and in commonly assigned copending application Ser. No. 07/744,755, filed Oct. 9, 1991, and additional art cited therein.

The elevated top surface of each projection or pad 2 as shown in the Figures are preferably smooth and flat, i.e. level or parallel to the main surfaces 5 and 6 of the propellant bodies 1; thereby aiding, foe example, in generant and stacked generant array strength as well as simplifying fabrication of the shaped bodies of generant.

The walls 3 of projections 2 descending to the surfaces 5 and 6 of generant bodies 1 can have almost any shape as long as the bodies (individually and collectively) have sufficient strength and the bodies do not present any significant fabrication difficulties including ease of separation from the die press. The 45° angled wall 3 as shown in FIG. 2 is preferred. FIG. 1 show another embodiment where walls 3 make a straight drop or 90° angle with the generant face. Walls 3 and 3' could also take the form of concave or convex curves or be stepped or tiered.

The generant body 1 is preferably a wafer, more preferably a disc or cylinder and most preferably a washer-shaped disc as shown in the Figures. However, the overall shape of the propellant body perimeter, when used in an inflator, is usually dictated by the shape of the combustion chamber in which the bodies are arranged, as similarly shown in aforementioned U.S. Pat. No. 4,890,860. Thus many other generant body shapes may be used, such as star-shaped or rectangular (preferably a square). And although central holes or openings 9 are preferred, they may be omitted for certain applications, e.g. a solid multi-wafer grain design as disclosed in aforementioned U.S. Pat. No. 4,158,696. Circular shaped openings are most preferred as shown in the Figures. The shape of the opening, however, is usually governed by the shape of the igniter chamber on which the generant bodies are preferably arranged, as similarly shown in U.S. Pat. No. 4,890,860. Thus such openings may generally take any shape, such as star-shaped or rectangular (square preferred). Also the perimeter wall 8 of the propellant body, as well as central wall 10 of openings 9 (if used), may be saw-toothed or serrated thereby increasing the generant surface area for combustion or to facilitate grain assembly, etc.

When comparing the three embodiments shown, the FIGS. 1 and 2 wafers are more preferred since they produce superior strength, combustion and gas flow properties for reasons to follow. The FIG. 2 configuration is most preferred. It is believed that the curved-wall configurations of projections especially of FIGS. 1 and 2 reduce the tendency of cracks to propagate along straight lines by minimizing high bending stresses and consequent cracking as well as ignitor shattering effects experienced in similar wafers. It is believed significant that when viewing either side of the wafers shown in FIGS. 1 and 2 that the curved walls 3 are so configured that:

(1) from the center 11 of any given wafer face a straight line cannot be drawn diametrically through any lowered section (spaces 5) without intersecting any raised section (projections 2); or, preferably, (2) from the outside edge 10 of central opening 9 of any given wafer face a straight line cannot be drawn diametrically through any lowered section without intersecting any raised section.

Providing projections 2 on both sides of bodies 1 (similar to the FIGS. 2–4 embodiment) is also a preferred configuration for whatever projection arrangement is selected, including the embodiments of FIGS. 1 and 5.

Instead of having a radially aligned row of spaced projections 2 on both sides of the generant body 1 (as shown in FIG. 3), it is more preferred that the projections (of whatever shape) on one side be radially offset or staggered (i.e. misaligned) with those on the other side because of enhanced wafer and generant body strength (individually and collectively), as well as increased randomness of exposed combustion surfaces and improved overall gas flow when a stacked array (as depicted in FIG. 4) is combusted. The smooth curvilinear surfaces of the projections shown in the Figures, especially FIGS. 2–4 result in optimum gas flow. The wafer configurations shown may have the top and bottom faces of the projections curving either in the same or, preferably, opposite directions as seen from a top sectioned view. These raised sections may have a clockwise or, as shown, a counterclockwise curvature or slope, and that curvature or slope may vary considerably, as is depicted in these Figures, preferably on the order of that shown in FIG. 2 so that, as previously indicated, a straight line cannot be drawn diametrically from the edge 10 of wafer opening 9 through any lower section or space 5 without intersecting any raised section. Thus the most preferred generant body configuration would be one having curved-wall projections on both faces of the body as shown in FIGS. 2–4, which curve (from a top sectioned view) in opposite directions, along with the projections on one side of the body being offset with those on the opposite face since the above mentioned qualities and properties of individual bodies, as well as abutting assemblies thereof, would be maximized. Thus in the most preferred configuration just described, the projections would curve in the same direction no matter which wafer face is examined. This wafer design would also allow for increased loading when forming an array by stacking similar wafers due to the more distributed load across the surfaces of the wafers. Though the inside walls 3 of the projections in FIGS. 1–5 curve outwardly in a counterclockwise fashion, as previously indicated and shown, such direction is not critical, thus they may curve clockwise instead. However, for a given set or array of wafers making up a generator stack or grain, it is preferred that they all have the same direction of curvature when viewing each wafer face.

None of the generant body 1 dimensions (e.g. thickness, outside diameter and inside diameter) are critical and may vary widely. For the most preferred applications, such dimensions would in general follow the typical dimensions well known in the gas bag inflator art as disclosed in aforementioned U.S. Pat. Nos. 4,890,860 and 4,998,751. And in the case of a rectangular generant body the length of the four sides also may vary, but are preferably equal (i.e. a square) or near equal. Similarly the height of the projections is not critical and can vary widely. The height of the projections may be increased, for example, to minimize the shock effects of combustion; or decreased, for example, to reduce the open area between generant bodies to enhance ignition and reduce the length needed for the overall stack of bodies thereby increasing the volumetric loading fraction.

Although the multi-projection generant wafer bodies according to the invention are especially designed to abut one another, they may be used with intervening or alternating smooth surface wafers commonly employed or may be used with inert spacer elements as typified in U.S. Pat. Nos. 3,901,530 and 4,890,860. However, it is advantageous to eliminate the use of such alternating non-gas contributing components in order to achieve more efficient combustion and simplify the inflator design. Use of the multi-projection generant bodies 1 of the present invention in a stack allows, for example, for the elimination of extra features and hardware from prior designs, which features and hardware make inflator assembly more difficult and costly as well as increasing the potential for system failure. Also the propellant bodies 1 may be coated in whole or in part with, for example, a combustion modifying material, e.g. an enhancing agent as disclosed in U.S. Pat. No. 4,200,615.

With this description of the invention in detail, those skilled in the art will appreciated the various modifications may be made to the invention without departing from the spirit thereof. Therefore it is not intended that the scope of the invention be limited to the specific embodiments illustrated and described. Rather it is intended that the invention scope be determined by the appended claims and their equivalents.

We claim:

1. In a gas generant wafer comprising a solid body having a plurality of relatively flat-surfaced, alike projections equally spaced and radially equidistant about the periphery of at least one side or face of the wafer thereby defining lower flat-surfaced sections or spaces between the projections, the improvement wherein each projection is defined by a first arcuate inside wall which is spaced from a second inside wall and both of which walls emanate from the center of the generant wafer curving and flaring outwardly to the peripheral edge of the wafer, and wherein at least one angular arc length of each projection is significantly greater than the angular arc length of each space therebetween.

2. A generant wafer according to claim 1 having a disc shape and wherein the outer edge of each projection is contiguous with the perimeter of the disc.

3. A generant body according to claim 1 comprised of an azide based composition.

4. A generant wafer according to claim 1 comprising three projections.

5. A generant wafer according to claim 1 comprising five projections.

6. A generant wafer according to claim 1 comprising ten projections.

7. A generant wafer according to claim 1 having a disc shape and wherein said projections are on both sides of the disc.

8. A generant disc according to claim 7 wherein the outer edge of each projection is contiguous with the perimeter of the disc.

9. A generant disc according to claim 8 wherein said arcuate walls curve in one direction on the top face and in an opposite direction on the bottom face.

10. A generant disc according to claim 7 wherein said arcuate walls curve in one direction on the top face and in an opposite direction on the bottom face.

11. A random stack of generant wafers as defined in claim 10.

12. A generant disc according to claim 7 wherein the projections on opposite sides of the body are radially aligned.

13. A generant disc according to claim 7 wherein the projections on opposite sides of the disc are radially staggered or offset.

14. A random stack of generant discs as defined in claim 7.

15. A gas generator for an automobile gas bag inflator comprising a combustion chamber having a gas outlet, a gas generating grain comprising a random stack of generant discs as defined in claim 1 disposed within said chamber, means for igniting said grain, and means for routing gas generated from said chamber through said outlet.

16. A gas generator according to claim 15, wherein each wafer is disc shaped.

* * * * *

UNITED STATES PATENT AND TRADEMARK OFFICE
CERTIFICATE OF CORRECTION

PATENT NO. : 5,551,343
DATED : September 3, 1996
INVENTOR(S) : Hock et al.

It is certified that error appears in the above-indentified patent and that said Letters Patent is hereby corrected as shown below:

Col. 7, line 18 of the patent, "foe" should be "for".

Col. 10, lines 3, 5 and 7, insert -- a disc having -- after "comprising".

Col. 10, line 19, "disc" should be "wafer".

Col. 10, line 35, "discs" should be "wafers".

Signed and Sealed this

Twenty-second Day of April, 1997

Attest:

BRUCE LEHMAN

*Commissioner of Patents and Trademarks*

*Attesting Officer*